US012623521B2

(12) United States Patent
    Wedekind et al.

(10) Patent No.:    US 12,623,521 B2
(45) Date of Patent:        May 12, 2026

(54) MULTI-FUNCTIONAL SUNROOF ASSEMBLY BRACKET ENDCAP AND DEFLECTOR PROTECTOR

(71) Applicant: Aisin Corporation, Kariya (JP)

(72) Inventors: Micah S. Wedekind, Livonia, MI (US);
 Michael A. Mixon, Brighton, MI (US);
 Glover A. Kosch, Ann Arbor, MI (US);
 Jacob C. Grimaldo, Westland, MI (US)

(73) Assignee: AISIN CORPORATION, Kariya (JP)

( * ) Notice: Subject to any disclaimer, the term of this patent is extended or adjusted under 35 U.S.C. 154(b) by 433 days.

(21) Appl. No.: 18/367,664

(22) Filed: Sep. 13, 2023

(65) Prior Publication Data

US 2025/0083504 A1      Mar. 13, 2025

(51) Int. Cl.
 *B60J 7/043*         (2006.01)
(52) U.S. Cl.
 CPC .................................. *B60J 7/0435* (2013.01)
(58) Field of Classification Search
 CPC ...................................................... B60J 7/0435
 See application file for complete search history.

(56) References Cited

U.S. PATENT DOCUMENTS

2025/0121661 A1*    4/2025    Yanagitani ............... B60J 7/024

FOREIGN PATENT DOCUMENTS

| CN | 106457984 A | * | 2/2017 | ............. B60J 7/192 |
| CN | 211138988 U |  | 7/2020 | |
| CN | 216969291 U |  | 7/2022 | |
| CN | 218594105 U |  | 3/2023 | |

* cited by examiner

*Primary Examiner* — Faye M Fleming
(74) *Attorney, Agent, or Firm* — Sughrue Mion, PLLC

(57)        ABSTRACT

A sunroof assembly includes a bracket removably attached to a sunroof panel and defining a cavity. The sunroof assembly also includes an endcap removably attached to the bracket that closes the cavity and maintains clearance between the sunroof panel and a deflector of the sunroof assembly by contacting the deflector as the sunroof panel moves between an open position, in which the deflector is in a raised position, and a closed position, in which the deflector is in a stowed position.

20 Claims, 6 Drawing Sheets

MULTI-FUNCTIONAL SUNROOF ASSEMBLY BRACKET ENDCAP AND DEFLECTOR PROTECTOR

TECHNICAL FIELD

The subject matter described herein relates, in general, to sunroof assemblies and, more particularly, to bracket endcaps and deflector protectors for sunroof assemblies.

BACKGROUND

In some vehicles, sunroof assemblies include sunroof panels that open and close a sunroof opening in a roof of the vehicle. In some instances, sunroof panels are constructed from glass, allowing a passenger of the vehicle to see through the sunroof opening when the sunroof panel closes the sunroof opening. While glass provides transparency, it may flex under wind pressure as the vehicle travels forward. Accordingly, some vehicles include a bracket connected to the sunroof panel that extends laterally with respect to the vehicle and provides additional strength and rigidity to the sunroof panel. In some instances, the bracket is hollow, and the sunroof assembly additionally includes endcaps to close the bracket on either end.

In some vehicles, sunroof assemblies also include a deflector for diffusing high-pressure air traveling over the vehicle when the sunroof assembly is open. In some arrangements, the deflector includes a spring-loaded deflector arm and a mesh connected to the deflector arm and one or more other components of the sunroof assembly. In some arrangements, the deflector is stored under a sunroof panel of the sunroof assembly. As the sunroof panel moves to an open position, the sunroof panel retracts and allows the spring-loaded deflector arm to rise above the vehicle and stretch the mesh such that it is taut and functional to diffuse high-pressure air. Contrariwise, as the sunroof assembly moves to a closed position, the sunroof panel pushes the spring-loaded deflector arm down such that it is in a stowed position within the sunroof assembly. In some arrangements, contact between the sunroof panel and the deflector arm may cause damage to the sunroof panel and/or the deflector arm. Moreover, in some arrangements, the respective positions of the sunroof panel and the deflector arm during closing of the sunroof assembly may provide sub-optimal mechanical advantage to push the deflector arm to the stowed position. Accordingly, some sunroof assemblies include deflector protectors, which may be attached to the sunroof panel.

In vehicles that include both a bracket and a deflector, the sunroof assembly may include endcaps and deflector protectors that are both connected to the sunroof panel. In such instances, the use of both endcaps and deflector protectors requires the use of many additional fasteners for connecting the components to the sunroof panel and may increase the overall weight and cost of the sunroof assembly.

SUMMARY

In one embodiment, example systems relate to multifunctional bracket endcaps and deflector protectors for sunroof assemblies. In the embodiment described herein, a sunroof assembly includes a sunroof panel that opens and closes a sunroof opening of a vehicle. In some arrangements, the sunroof panel is constructed from glass, which may flex under wind pressure as the vehicle travels forward. Accordingly, in one arrangement, the sunroof assembly includes a bracket that is connected to the sunroof panel, extends laterally with respect to the vehicle, and provides additional strength and rigidity to the sunroof panel. In some instances, the bracket is bonded to the sunroof panel in a molding process in which the components of the sunroof assembly are loaded into a mold into which encapsulation material is inserted. In some instances, during the molding process, the bracket is hollow and encapsulation material may enter the bracket, which may increase the overall weight of the sunroof assembly. Accordingly, in one arrangement, the sunroof assembly also includes endcaps for closing off the hollow bracket during the molding process.

For multifunctionality and to reduce the overall number of components of the sunroof assembly, in one or more arrangements, the endcaps have a geometry that enables the endcaps to additionally function as deflector protectors. Accordingly, in one approach, the endcaps include endcap points, which are rounded points configured to contact deflector arms of a deflector of the sunroof assembly. In this way, in one approach, the endcaps contact the deflector arms, which may be spring-loaded, to prevent damage to the deflector arms, the encapsulation material, and/or the sunroof panel by maintaining clearance between the sunroof panel and the deflector arms. Moreover, in one arrangement and by way of contacting the deflector arms, the endcaps also serve to provide mechanical advantage to push the deflector arms to a stowed position as the sunroof panel closes the sunroof opening and inhibit rapid movement of the deflector arms from the stowed position as the sunroof panel opens the sunroof opening.

Accordingly, the arrangements described herein have the benefit of providing multifunctional bracket endcaps and deflector protectors for sunroof assemblies. As such, the sunroof assembly requires fewer parts than typical sunroof assemblies, which may provide bracket endcaps and deflector protectors as separate components. Moreover, the use of the endcaps as described herein decreases the number of fasteners required with the use of separate bracket endcaps and deflector protectors. Furthermore, by way of requiring fewer parts, the arrangements described herein also have the benefits of streamlining the sunroof assembly manufacturing process, improving the packaging of the sunroof assembly, and decreasing the total cost of the sunroof assembly. Moreover, the arrangements described herein have the benefit of reducing the risk of damage to the components of the sunroof assembly, including the sunroof panel, the encapsulation material, and the deflector arms, as well as providing the mechanical advantage necessary to stow the deflector as the sunroof panel moves to the closed position.

In one embodiment, a sunroof assembly includes a bracket removably attached to a sunroof panel and defining a cavity. The sunroof assembly also includes an endcap removably attached to the bracket that closes the cavity and maintains clearance between the sunroof panel and a deflector of the sunroof assembly by contacting the deflector as the sunroof panel moves between an open position, in which the deflector is in a raised position, and a closed position, in which the deflector is in a stowed position.

In another embodiment, a sunroof assembly includes a sunroof panel defining a sunroof panel edge lined with encapsulation material installed to the sunroof panel edge in a molding process. The sunroof assembly also includes a bracket removably attached to a sunroof panel and defining a cavity. The sunroof assembly further includes an endcap removably attached to the bracket that prevents encapsulation material from entering the cavity during the molding process by closing the cavity and that maintains clearance between a deflector of the sunroof assembly and the encapsulation material and prevents damage to the encapsulation material by contacting the deflector as the sunroof panel moves between an open position, in which the deflector is in a raised position, and a closed position, in which the deflector is in a stowed position.

In yet another embodiment, a sunroof assembly includes a sunroof panel defining a first corner and a second corner. The sunroof assembly also includes a bracket removably attached to the sunroof panel that extends between the first corner and the second corner and defines a cavity having a first opening below the first corner and a second opening below the second corner. The sunroof assembly also includes a deflector located below the sunroof panel and defining a first deflector arm located below the first corner and a second deflector arm located below the second corner. The sunroof assembly also includes a first endcap removably attached to the bracket at the first opening and a second endcap removably attached to the bracket at the second opening. The first endcap and the second endcap maintain clearance between the sunroof panel and the deflector by respectively contacting the first deflector arm and the second deflector arm as the sunroof panel moves between an open position, in which the deflector is in a raised position, and a closed position, in which the deflector is in a stowed position.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
FIG. 1 illustrates one example of a vehicular sunroof assembly including a sunroof panel and a deflector.

Systems and other embodiments associated with a deflector protector for a sunroof assembly are disclosed. As mentioned above, in vehicles that include both a bracket and a deflector, the sunroof assembly may include bracket endcaps and deflector protectors that are both connected to the sunroof panel. In such arrangements, the use of both endcaps and deflector protectors requires the use of many additional fasteners for connecting the components to the sunroof panel and may increase the overall weight and cost of the sunroof assembly. Accordingly, the arrangements described herein provide multifunctional bracket endcaps and deflector protectors for a sunroof assembly that eliminate the need for separate bracket endcaps and deflector protectors. As a result, through use of the bracket endcaps, the sunroof assembly has fewer parts, lower cost, and a more stream-lined assembly process than other sunroof assemblies.

In one example, multifunctional bracket endcaps and deflector protectors for sunroof assemblies are disclosed. In some vehicles, a sunroof assembly includes a sunroof panel that opens and closes a sunroof opening in the vehicle. The sunroof panel is constructed from glass in some arrangements, which sometimes flexes under wind pressure as the vehicle moves forward. To strengthen and rigidify the sunroof panel, the sunroof assembly includes a bracket connected to the sunroof panel. The bracket is formed, in one example, from a high-strength material such as metal, and is hollow for the purpose of lightweighting the sunroof assembly. In one arrangement, the bracket is connected to the sunroof panel in a lateral direction with respect to the vehicle.

To connect the bracket to the sunroof panel, in one approach, the bracket and the sunroof panel are bonded to each other in a molding process. During the molding process, the components of the sunroof assembly are placed in a mold, and encapsulation material is added to the mold. In some instances, during the molding process, encapsulation material may enter the hollow bracket, which may increase the overall weight of the sunroof assembly. Accordingly, in one arrangement, the sunroof assembly includes endcaps for closing off the bracket to prevent encapsulation material from entering the bracket.

The endcaps additionally function as deflector protectors. As mentioned above, the sunroof assembly includes a deflector that has spring-loaded deflector arms that bias the deflector to a raised position. To function as deflector protectors, in one arrangement, the endcaps include rounded points that contact the deflector arms to prevent damage to the deflector arms, the encapsulation material, and/or the sunroof panel by maintaining clearance between the sunroof panel and the deflector arms. Moreover, in one arrangement, the endcaps also provide mechanical advantage to push the deflector arms to a stowed position as the sunroof panel closes the sunroof opening and/or inhibit rapid movement of the deflector arms from the stowed position as the sunroof panel opens the sunroof opening.

Accordingly, the arrangements described herein advantageously provide multifunctional bracket endcaps and deflector protectors for sunroof assemblies. By way of the multi-functionality of the endcaps, the sunroof assembly requires fewer parts than typical sunroof assemblies that have separate bracket endcaps and deflector protectors. Moreover, the arrangements herein require the use of fewer fasteners compared to sunroof assemblies that have separate bracket endcaps and deflector protectors. Furthermore, as a result of fewer components, the arrangements described herein also have the benefit of streamlining the sunroof assembly manufacturing process, improving the packaging of the sunroof assembly, and decreasing the total cost and/or weight of the sunroof assembly. The multifunctional endcaps also help prevent damage to the components of the sunroof assembly and provide the mechanical advantage necessary to stow the deflector as the sunroof panel closes the sunroof opening.

Part of a representative passenger vehicle 100 is shown in FIG. 1. The vehicle 100 includes an exterior and a number of interior compartments. In one arrangement, the vehicle 100 includes a body that forms the exterior and defines or otherwise encloses the compartments. In some instances, the body includes a first side 110A, a second side 110B, a horizontal roof 120, a floor, a front end, a rear end, and the like. In one example, the body is constructed from a combination of rigidly interconnected frame members, panels, and other body elements, as well as a combination of overlying paneling, trim, upholstery, and other body coverings. In some instances, the body elements have a combination of fabricated, bent, stamped, extruded, cast, molded and like constructions, and are made from a combination of metallic, polymeric and like materials.

The roof 120 extends laterally between the first side 110A and the second side 110B. As part of the roof 120, the body includes a sunroof opening that opens between the passenger compartment and the exterior. Moreover, in one arrangement, the body includes a roof panel that defines the sunroof opening. Moreover, in some instances, the body includes a pair of roof rails and, as part of the roof panel, a roof header, that frame the sunroof opening. In one arrangement, the roof rails are laterally spaced apart from one another about the sunroof opening and extend longitudinally. In one example, the roof panel extends longitudinally from the roof header, and laterally between the roof rails. In one arrangement, the roof header is forward of the sunroof opening and extends laterally between the roof rails. In an assembled state, in some instances, the roof rails, the roof panel, and the roof header are secured to one another. In one arrangement, the roof panel, including the roof header, is secured to the roof rails along its length. In one example, the roof header, as part of the roof panel, is secured to the roof rails at its ends.

In some arrangements, the vehicle 100 includes a sunroof assembly 130 that is installed to the sunroof opening. Among other components typical of sunroof assemblies, in some arrangements, the sunroof assembly 130 includes a sunroof panel 140 that extends between the first side 110A and the second side 110B and opens and closes the sunroof opening. When the sunroof assembly 130 is in an open position, as shown in FIG. 1, the sunroof panel 140 opens the sunroof opening, and in a closed position, the sunroof panel 140 closes the sunroof opening. The sunroof panel 140 can be made from a material suitable for closing the passenger compartment from an external environment of the vehicle 100 while allowing a passenger in the vehicle 100 to see through the sunroof panel 140 when the sunroof panel 140 is in the closed position. In one example, the sunroof panel 140 is made of glass, but in other examples, the sunroof panel 140 can be made of one or more other suitable materials. Although the sunroof assembly 130, as shown, includes one sunroof panel 140, this disclosure is applicable in principle to otherwise similar vehicles whose sunroof assemblies include multiple sunroof panels. The sunroof assembly 130 also includes one or more sunshades and driving equipment for moving the sunroof panel 140 that moves the sunroof panel 140 and/or the sunshades between the open position and the closed position.

The sunroof assembly 130 also includes a housing 150 that houses various components of the sunroof assembly 130 and supports the components for attachment to the vehicle 100. In one arrangement, the housing 150 is attached to the roof header and/or other components of the vehicle and is located within the sunroof opening. To fit to the sunroof opening, in one example, the housing 150 has a shape that substantially matches the shape of the sunroof opening. More specifically, in one example, the housing 150 has curved corners including a first front corner 160A and a second front corner 160B that align with the shape of the sunroof opening. While the remainder of this disclosure is described with reference to the first front corner 160A, in some instances, the description herein also applies to the second front corner 160B.

Among the components supported by the housing 150, the sunroof assembly 130 includes a deflector 170. As shown, in one example, the deflector 170 includes a first deflector arm 180A and a first deflector arm 180B each hingedly connected to the housing 150 on opposite sides of the sunroof assembly 130. In some instances, the first deflector arm 180A and the second deflector arm 180B are spring-loaded in a manner that is biased towards a raised position above the sunroof assembly 130, as shown in FIG. 1. When the sunroof assembly 130 is installed to the sunroof opening, in one arrangement, the first deflector arm 180A is located above the first front corner 160A, and the first deflector arm 180B is located above the first front corner 160A. In the embodiment shown, the first deflector arm 180A and the first deflector arm 180B are formed as a unitary component. However, in other embodiments, the first deflector arm 180A and the first deflector arm 180B are formed as separate components that are later connected together.

In addition to the first deflector arm 180A and the second deflector arm 180B, the deflector 170 also includes a mesh 190 connected to the first deflector arm 180A, the first deflector arm 180B, and the housing 150 By way of being spring-loaded, in one arrangement, the first deflector arm 180A and the first deflector arm 180B are arranged to expand the mesh 190 above the housing 150 when the sunroof assembly 130 is in the open position and retract the mesh 190 under the sunroof panel 140 when the sunroof assembly 130 is in the closed position. When the sunroof assembly 130 is in the open position and as the vehicle 100 travels in a forward direction, the mesh 190 is stretched to a tautness such that the mesh 190 directs airflow over the sunroof opening and diffuses high pressure air in such a way as to reduce wind noise and turbulent airflow into the passenger compartment. Contrariwise, when the sunroof assembly 130 is in the closed position, the deflector 170 is stowed in the housing 150.

As mentioned above, when the sunroof assembly 130 is in the open position or the closed position, the sunroof panel 140 may flex due to wind pressure as the vehicle 100 travels forward. Flexing of the sunroof panel 140, in some instances, is caused by flexibility of the material that the sunroof panel 140. For example, in some arrangements, the sunroof panel 140 is made of glass that is flexible in the Z-direction with respect to the vehicle 100. In some instances, wind pressure may become so great that the sunroof panel 140 over-flexes and shatters. Accordingly, to provide strength to the sunroof panel 140 and mitigate flexing of the sunroof panel 140, in one or more arrangements, the sunroof assembly 130 includes a bracket 200. The bracket 200, in one approach, is connected to the sunroof panel 140 and made from a high-strength material to impart rigidity to the sunroof panel 140.

Figure 2A:
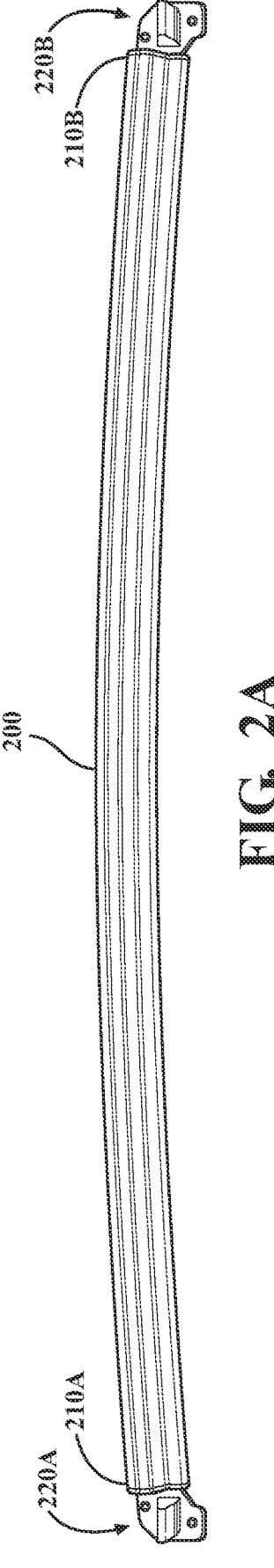
FIG. 2A illustrates one example of a bracket and endcaps for the sunroof assembly, where the endcaps function as deflector protectors for the deflector.
Figure 2B:
FIG. 2B illustrates one example of an underside of the sunroof assembly including an encapsulation that bonds the bracket and the endcaps to the sunroof panel.

An example of the bracket 200 is shown in FIG. 2A. In one arrangement, the bracket 200 is attached to an underside of the sunroof panel 140, as shown in FIG. 2B and described in further detail below. When attached to the sunroof panel 140, in one example, the bracket 200 extends laterally across the sunroof panel 140 with respect to the X-direction of the vehicle 100. In one arrangement, the bracket 200 is positioned towards the forward end of the vehicle 100 near the housing 150 and defines a first bracket end 210A located at or near the first front corner 160A and a second bracket end 210B located at or near the second front corner 160B. Moreover, in some arrangements, the first bracket end 210A is located above the first deflector arm 180A and the second bracket end 210B is located above the first deflector arm 180B.

As mentioned above, the bracket 200 is formed from a high-strength material. In one approach, the bracket 200 is made of metal using a roll-forming process, which is a continuous process that converts sheet metal into an engineered shape using consecutive sets of mated rolls, each of which makes incremental changes in the form such that the sum of the incremental changes is a complex profile. Accordingly, in one arrangement, the bracket 200 is a roll-formed bracket. However, in other approaches, the bracket 200 is made from other types of manufacturing processes, for example, an extrusion process. Moreover, as mentioned above, the bracket 200 is formed of metal, however, in other examples, the bracket 200 is formed from other materials suitable for imparting strength and rigidity to the sunroof panel 140.

As described in further detail below, in one or more arrangements, the first bracket end 210A and/or the second bracket end 210B may be hollow. In such arrangements, the sunroof assembly 130 also includes one or more endcaps fitted to the bracket 200 to close the first bracket end 210A and/or the second bracket end 210B. In the example shown, the sunroof assembly 130 includes a first endcap 220A and a second endcap 220B respectively installed to the first bracket end 210A and the second bracket end 210B. In some instances, the first endcap 220A and the second endcap 220B are substantially identical in one or more aspects, while in other instances, the first endcap 220A and the second endcap 220B are different from each other in one or more aspects. In one approach, the endcaps 220A, 220B are installed to the bracket 200 before the bracket 200 is placed on the sunroof panel 140 for later attachment to the sunroof panel 140. In addition to closing the first bracket end 210A and/or the second bracket end 210B, the endcaps 220A, 220B serve various other purposes for the sunroof assembly 130 that are described in further detail below.

As mentioned briefly above, the bracket 200 is attached to the sunroof panel 140. Additionally, the endcaps 220A, 220B are also connected to the sunroof panel 140 in conjunction with the attachment of the bracket 200 to the sunroof panel 140. With reference now to FIG. 2B, in one or more arrangements, the sunroof assembly 130 includes an encapsulation 230 that attaches the bracket 200 and the endcaps 220A, 220B to the sunroof panel 140. More specifically, in one example, the encapsulation 230 bonds the bracket 200 and the endcaps 220A, 220B to the sunroof panel 140. In some instances, as described in further detail below, the encapsulation 230 also lines an edge of the sunroof panel 140 to protect the edge of the sunroof panel 140 from damage.

In an example method of attaching the bracket 200, the endcaps 220A, 220B, and the sunroof panel 140, the endcaps 220A, 220B are first installed to the bracket 200, and the bracket 200 together with the endcaps 220A, 220B is set on the sunroof panel 140. Next, in one approach, the sunroof panel 140 together with the bracket 200 and the endcaps 220A, 220B is inserted into a mold. The mold, in one example, has the appropriate shape for the encapsulation

230, including the contours of the bracket 200, the endcaps 220A, 220B, the sunroof panel 140, and/or other components of the sunroof assembly 130. In a next phase of the method, in one approach, encapsulation material is inserted into the mold in liquid form. In other words, the sunroof panel 140, the bracket 200, and the endcaps 220A, 220B are bonded in a molding process. Once cured, in some examples, through the application of heat, the encapsulation material bonds the sunroof panel 140 to the bracket 200 and the endcaps 220A, 220B. In some arrangements, the encapsulation 230 may be additionally secured to the components of the sunroof assembly 130 using fasteners. Accordingly, the encapsulation 230 includes apertures 240 that substantially align with apertures in the bracket 200 and/or the endcaps 220A, 220B that receive the fasteners for further securing the components of the sunroof assembly 130.

The encapsulation material, in one example, is a material suitable for bonding the sunroof panel 140 to the bracket 200 and the endcaps 220A, 220B. In one example, the encapsulation material is polyurethane, but the encapsulation material can be other materials, for example, other thermoplastic materials. Moreover, the molding process is, in some approaches, a reaction-injection molding (RIM) process, but in other approaches, the molding process is another type of molding process, for example, another type of injection molding process. Moreover, the components of the sunroof assembly 130 described above, including the bracket 200, the endcaps 220A, 220B, and the encapsulation 230, are removably attached to the sunroof panel 140. For example, the bracket 200 and/or the endcaps 220A, 220B may be removed from the sunroof panel 140 after removal of the encapsulation 230.

As mentioned above, the first bracket end 210A and/or the second bracket end 210B may be hollow. In fact, in some arrangements, the entire bracket 200 is hollow. Use of a hollow bracket is, in one or more arrangements, advantageous for lightweighting the sunroof assembly 130. As mentioned above, during the molding process, the endcaps 220A, 220B serve to close off the ends of the bracket 200 so that the encapsulation material does not enter the bracket 200. In some instances, it is advantageous to prevent the encapsulation material from entering the bracket 200 so that the bracket 200 and the rest of the sunroof assembly 130 do not have an increased weight from unnecessary encapsulation material in the bracket 200.

Figure 3A:
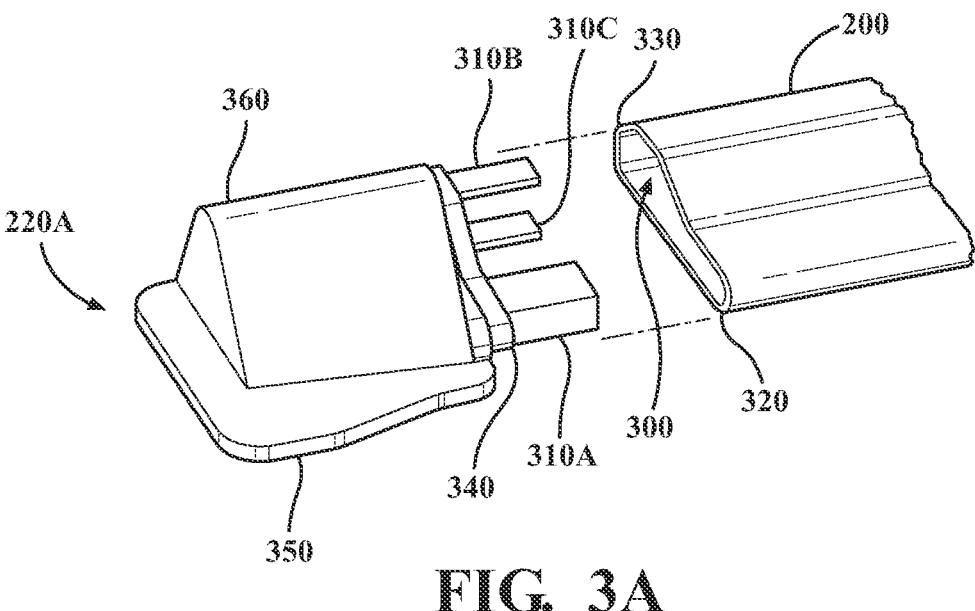
FIG. 3A illustrates one example of the one of the endcaps before installation to the bracket.
Figure 3B:
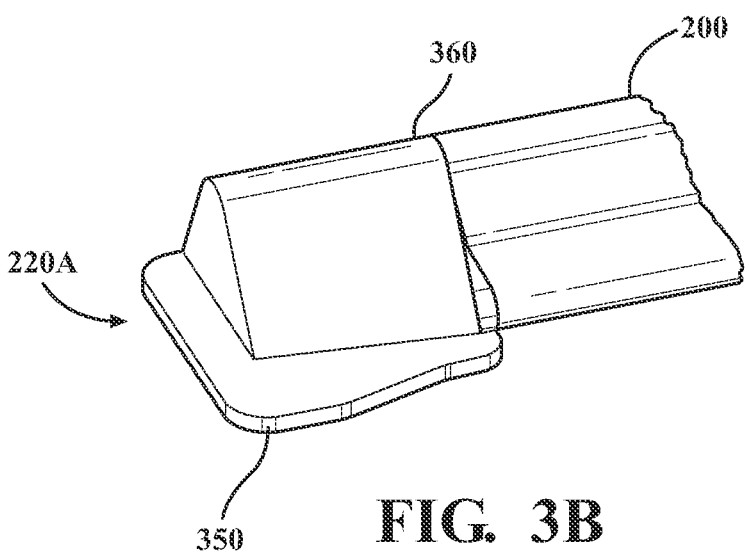
FIG. 3B illustrates one example of one of the endcaps installed to the bracket.

Referring now to FIGS. 3A and 3B, the bracket 200 defines a cavity 300. The cavity 300, in one example, extends from the first bracket end 210A to the second bracket end 210B. Thus, in one arrangement, as mentioned above, the bracket 200 is hollow along its entire length, and the cavity 300 extends along the entire length of the bracket 200. In other arrangements, the cavity 300 may not extend along the entire length of the bracket 200. For example, the bracket 200 may be hollow at the first bracket end 210A or the second bracket end 210B, and thus the cavity 300 may be limited to the first bracket end 210A or the second bracket end 210B. In another example, the bracket 200 may be hollow at both the first bracket end 210A or the second bracket end 210B and not hollow in a middle area along the bracket 200. In the embodiment described herein, the bracket 200 is hollow along its entire length and the cavity 300 extends along the entire length of the bracket 200. In embodiments in which the bracket 200 is only hollow on one side, a single endcap may be used to close the cavity 300. Moreover, while the remainder of this description references the first endcap 220A, in some instances, the description also applies to the second endcap 220B in one or more aspects.

An example of the installation of the first endcap 220A to the cavity 300 is shown. In some instances, the following description applies to the second endcap 220B as well. In some arrangements, for installation to the bracket 200, the first endcap 220A includes legs. The legs function to align the first endcap 220A with the bracket 200 during installation of the first endcap 220A to the bracket 200. As shown, the first endcap 220A includes three legs including a first leg 310A, a second leg 310B, and a third leg 310C, however, the first endcap 220A can include another number of legs suitable for installing the first endcap 220A to the bracket 200. In one approach, the legs 310A, 310B, and 310C are inserted into the cavity 300 for installing the first endcap 220A to the bracket 200. In some arrangements, for example, as shown, the location of the legs 310A, 310B, and 310C corresponds to one or more contours of the cavity 300. For example, the cavity 300 may define a narrow contour 320 and a wide contour 330. In one arrangement, for example, in the embodiment shown, the first leg 310A is wider than the second leg 310B and the third leg 310C and is installed to the narrow contour 320. Moreover, in one arrangement, the second leg 310B and the third leg 310C are thinner than the first leg 310A and are installed to opposite sides of the wide contour 330. Accordingly, in one arrangement, the legs 310A, 310B, and 310C have a shape corresponding to the contours of the cavity 300, and by way of installation to the cavity 300, the legs 310A, 310B, and 310C maintain the position of the first endcap 210A relative to the bracket 200.

In some arrangements, the legs 310A, 310B, and 310C secure the first endcap 210A to the bracket 200. However, for additional security of the first endcap 220A to the bracket 200, in some arrangements, one or more of the legs 310A, 310B, and 310C includes a ridge 340. As shown, the first leg 310A includes a ridge 340, but in other arrangements, one or more of the first leg 310A, the second leg 310B, and the third leg 310C can include a ridge 340. In some examples, the ridge 340 pressure-fits the legs 310A, 310B, and 310C to the contours of the cavity 300 to help prevent the first endcap 220A from coming loose from the cavity 300. Like other components of the sunroof assembly 130, in some instances, the first endcap 220A is removably attached to the bracket 200.

In addition to the legs 310A, 310B, 310C, the first endcap 220A also includes a base 350. In one example, the base 350 is a flat portion of the first endcap 220A that is substantially flush with the sunroof panel 140 when the first endcap 220A is bonded to the sunroof panel 140. In some arrangements, the base 350 functions to secure the first endcap 220A to the sunroof panel 140 during the encapsulation 230 process. For example, the encapsulation material overlies the base 350 (as shown in FIG. 2B) and secures the first endcap 220A to the sunroof panel 140. Moreover, in addition to the legs 310A, 310B, 310C and the base 350, the first endcap 220A also includes, in some arrangements, an endcap point 360. In one example, the endcap point 360 is a portion of the first endcap 220A that rises above the bracket 200. As described in further detail below, the endcap point 360 of the first endcap 220A contacts the first deflector arm 180A. Similarly, in some instances, the second endcap 220B also includes an endcap point 360 that contacts the second deflector arm 180B, as described in further detail below. In some instances, the endcap point 360 of the first endcap 220A is rounded so that the first endcap 220A has the ability to slide in a smooth manner along the first deflector arm

180A. In this way, as described in further detail below, the first endcap 220A serves as a deflector protector for the sunroof assembly 130.

In some arrangements, the components of the first endcap 220A, including the legs 310A, 310B, and 310C, the ridge 340, the base 350, and the endcap point 360, are made from the same material. For example, the legs 310A, 310B, and 310C, the ridge 340, the base 350, and the endcap point 360 are made from plastic. In another example, the legs 310A, 310B, and 310C, the ridge 340, the base 350, and the endcap point 360 are made from another material, such as a thermoplastic. In some arrangements, the legs 310A, 310B, and 310C, the ridge 340, the base 350, and/or the endcap point 360 are made from different materials. Moreover, in one arrangement, the legs 310A, 310B, and 310C, the ridge 340, the base 350, and/or the endcap point 360 are formed unitarily as a single component. For example, the legs 310A, 310B, and 310C, the ridge 340, the base 350, and/or the endcap point 360 are formed unitarily using a molding process, such as an injection molding process, a casting process, or a 3D printing process. In other arrangements, the legs 310A, 310B, and 310C, the ridge 340, the base 350, and/or the endcap point 360 are formed as separate components that are later connected to each other.

By way of being manufactured components, in some arrangements, the aforementioned components of the first endcap 220A and/or the bracket 200 may include standard defects from manufacturing processes. For example, the metal of the bracket 200 may contain burrs. In some instances, such defects may contact the sunroof panel 140, thereby damaging the sunroof panel 140 and/or weakening the sunroof panel 140. Thus, in some instances, it may be advantageous to space the first endcap 220A and/or the bracket 200 from the sunroof panel 140 or decrease the amount of surface area of the first endcap 220A and/or the bracket 200 that contact the sunroof panel 140 to decrease the likelihood of a defect contacting and damaging the sunroof panel 140.

Figures 4A, 4B, 4C:
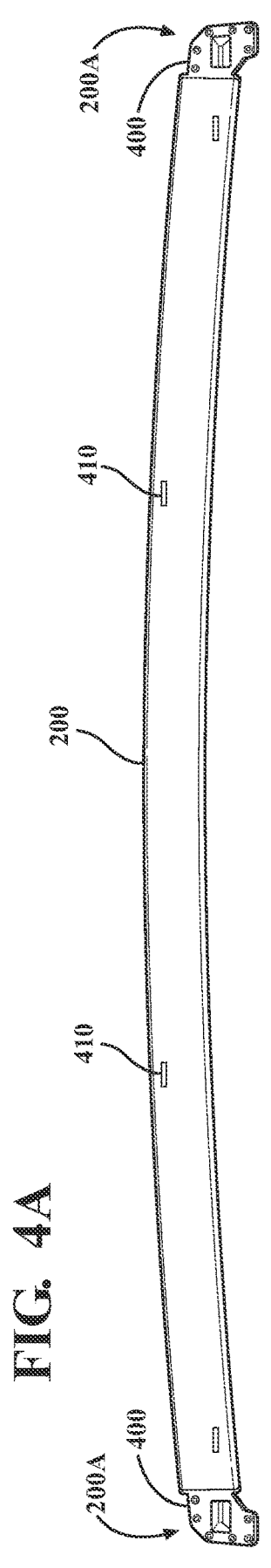
FIG. 4A illustrates one example of spacers for the bracket and/or the endcaps to maintain a distance between the bracket and/or the endcaps and the sunroof panel.
FIG. 4B illustrates one example of a close-up view of the spacers.
FIG. 4C illustrates one example of a close-up view of the spacers when the bracket and the endcaps are bonded to the sunroof panel.

Accordingly, referring now to FIGS. 4A 4B, and 4C, the first endcap 220A and/or the bracket 200 may include spacers. More specifically, in one example, the first endcap 220A includes endcap spacers 400. In one arrangement, the endcap spacers 400 space the base 350 from the sunroof panel 140 and decrease the surface area of the base 350 that contacts the sunroof panel 140. As shown, the endcap spacers 400 have substantially conical shapes with rounded tips, which improve the contact between the endcap spacers 400 and the sunroof panel 140. However, in other arrangements, the endcap spacers 400 have one or more other shapes. Moreover, while the figures show the endcap spacers 400 as each having substantially the same shape, in other instances, one or more of the endcap spacers 400 have different shapes.

In one arrangement, the endcap spacers 400 space the base 350 from the sunroof panel 140 by about 1 millimeter (mm). However, other spacings are possible, for example, about 0.5 mm, about 2 mm, about 5 mm, etc. Additionally, in one approach, the endcap spacers 400 are unitarily formed with the first endcap 220A as a single component, and in another approach, the endcap spacers 400 are formed as separate components from the first endcap 220A that are later attached to the base 350, for example, by adhesion and/or fasteners. Moreover, in one approach, the endcap spacers 400 are formed from the same material as the first endcap 220A, for example, plastic or thermoplastic, while in another approach, the endcap spacers 400 are formed from a different material from the first endcap 220A, for example, foam, rubber, etc.

In some arrangements, the spacers also include bracket spacers 410. In one arrangement, the bracket spacers 410 space the bracket 200 from the sunroof panel 140 and decrease the surface area of the bracket 200 that contacts the sunroof panel 140. As shown, the bracket spacers 410 have substantially rectangular shapes with a flat surface. However, in other arrangements, the bracket spacers 410 have one or more other shapes. In one arrangement, the bracket spacers 410 space the bracket 200 from the sunroof panel 140 by about 1 millimeter (mm), however, other spacings are possible, for example, about 0.5 mm, about 2 mm, about 5 mm, etc. Additionally, in one approach, the bracket spacers 410 are unitarily formed with the bracket 200 as a single component, and in another approach, the bracket spacers 410 are formed as separate components from the bracket 200 that are later attached to the bracket 200, for example, by adhesion and/or fasteners. In one approach, the bracket spacers 410 are formed from a material softer than the material of the bracket 200, for example, plastic, foam, rubber, etc.

Figure 5A:
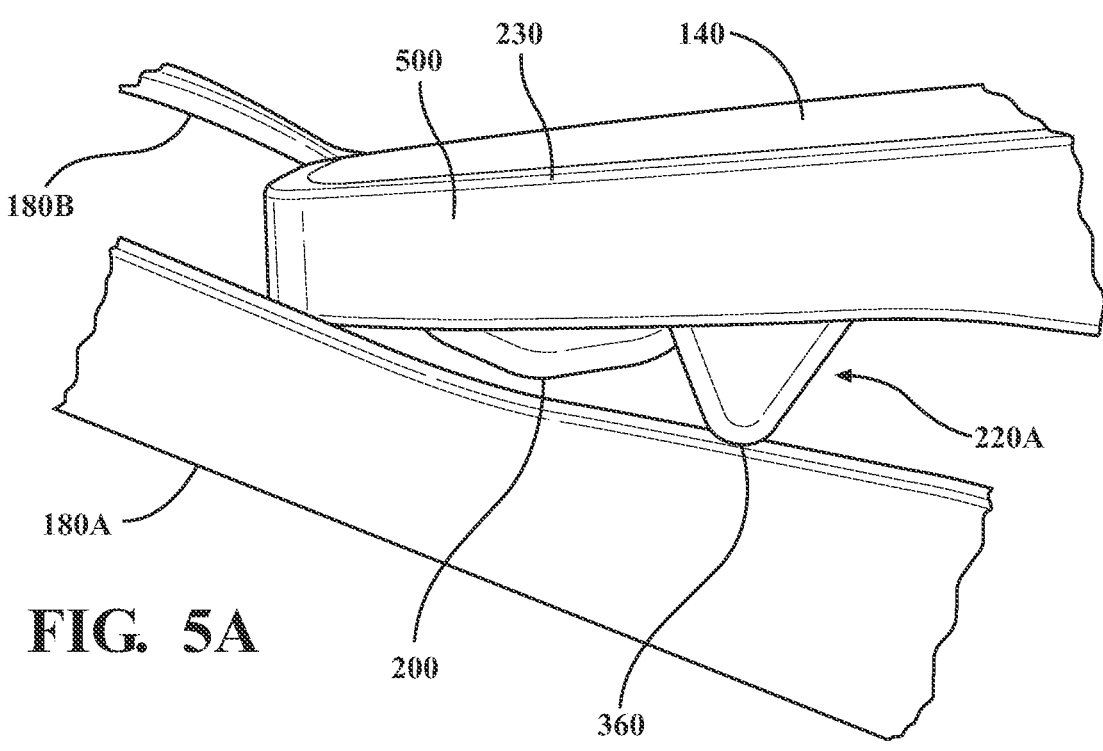
FIG. 5A illustrates one example of the sunroof assembly in a partially closed position, in which one of the endcaps pushes the deflector to a stowed position.
Figure 5B:
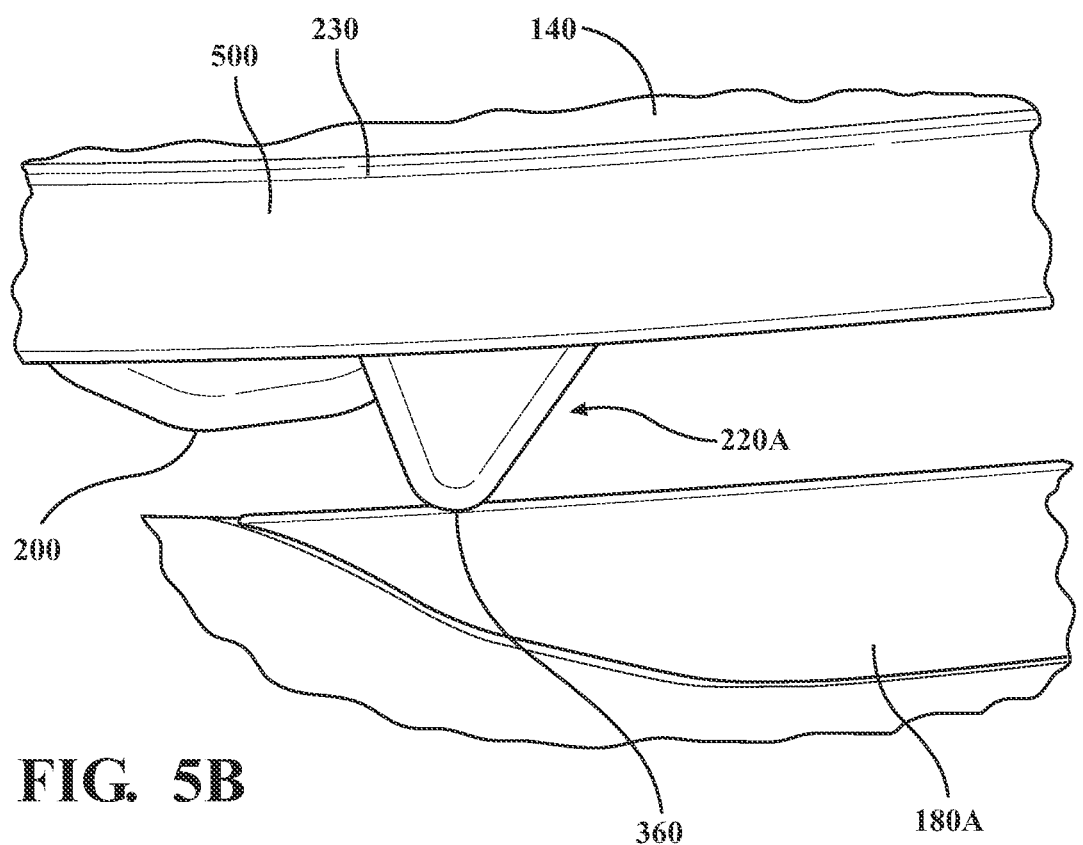
FIG. 5B illustrates on example of the sunroof assembly in a closed position with the deflector in the stowed position.

As mentioned above, the first endcap 220A functions as a deflector protector for the sunroof assembly 130. FIGS. 5A and 5B illustrate examples of the first endcap 220A contacting the deflector 170 to function as a deflector protector. By way of contacting the deflector 170, in some instances, the deflector protector protects the encapsulation material along an edge 500 of the sunroof panel 140. More specifically, in one example, the first endcap 220A contacts the first deflector arm 180A as the sunroof panel 140 moves from an open position to a closed position or from a closed position to an open position. FIG. 5A illustrates an example of the sunroof panel 140 in a partially closed position (e.g., moving from the open position to a closed position or moving from the closed position to an open position), and FIG. 5B illustrates the sunroof panel 140 in a closed position. As shown in FIG. 5A, the first endcap 220A contacts the first deflector arm 180A in the partially closed position. More specifically, the first endcap 220A point slides along the first deflector arm 180A in the partially closed position. In this way, the first endcap 220A maintains clearance between the first deflector arm 180A and the sunroof panel 140 and/or the encapsulation 230 during movement of the sunroof panel 140, thus preventing damage to the sunroof panel 140, the encapsulation material on the edge 500, and/or the first deflector arm 180A. Moreover, as the sunroof panel 140 moves from an open position to a closed position, the first endcap 220A provides mechanical advantage to push the first deflector arm 180A from a raised position to a stowed position. As the sunroof panel 140 moves from a closed position to an open position, the first endcap 220A inhibits rapid movement of the first deflector arm 180A from a stowed position to a raised position. Referring now to FIG. 5B, when the sunroof panel 140 is in a closed position, the first endcap 220A contacts the first deflector arm 180A to keep the first deflector arm 180A in a stowed position.

In arrangements in which the sunroof assembly 130 includes a first endcap 220A and a second endcap 220B, the first endcap 220A and the second endcap 220B respectively maintain clearance between the first deflector arm 180A and the second deflector arm 180B, as well as the sunroof panel 140 and/or the encapsulation 230 during movement of the sunroof panel 140, thus preventing damage to the sunroof panel 140, the encapsulation material on the edge 500, the first deflector arm 180A, and/or the second deflector arm

180B. Moreover, as the sunroof panel 140 moves from an open position to a closed position, the first endcap 220A and the second endcap 220B provide mechanical advantage to respectively push the first deflector arm 180A and the second deflector arm 180B from a raised position to a stowed position. Further, as the sunroof panel 140 moves from a closed position to an open position, the first endcap 220A and the second endcap 220B respectively inhibit rapid movement of the first deflector arm 180A and the second deflector arm 180B from a stowed position to a raised position. Additionally, when the sunroof panel is in a closed position, the first endcap 220A and the second endcap 220B respectively contact the first deflector arm 180A and the second deflector arm 180B to keep the deflector 170 in a stowed position.

The arrangements described herein have the benefit of providing a deflector protector for a sunroof assembly using fewer parts than typical sunroof assemblies, which may provide bracket endcaps and deflector protectors as separate components. Moreover, the use of the endcaps as described herein decreases the number of fasteners required with the use of separate bracket endcaps and deflector protectors. Furthermore, by way of requiring fewer parts, the arrangements described herein also have the benefits of streamlining the sunroof assembly manufacturing process, improving the packaging of the sunroof assembly, and decreasing the total cost of the sunroof assembly. Moreover, the arrangements described herein have the benefit of reducing the risk of damage to the components of the sunroof assembly, including the sunroof panel, the encapsulation material, and the deflector, as well as providing the mechanical advantage necessary to stow the deflector as the sunroof panel moves to the closed position.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5B, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ," as used herein, refers to and encompasses any and all possible combinations of one or more of the associated listed items. As an example, the phrase "at least one of A, B, and C" includes A only, B only, C only, or any combination thereof (e.g., AB, AC, BC, OR ABC).

In this description, uses of "front," "forward," and the like, and uses of "rear," "rearward," and the like, refer to the longitudinal directions of the vehicle. "Front," "forward," and the like refer to the front (fore) of the vehicle, while "rear," "rearward," and the like refer to the back (aft) of the vehicle. Uses of "side," "sideways," "transverse," and the like refer to the lateral directions of the vehicle. Uses of "above," "below," and the like refer to the vertical directions of the vehicle.

In this description, in one arrangement, the compartments of the vehicle include a passenger compartment, an engine compartment, a cargo area, and the like. Among other things, in one arrangement, the vehicle includes seats, a dash assembly, an instrument panel, controls, and the like housed in the passenger compartment. Additionally, in some instances, the vehicle may include an engine, a motor, a transmission, and the like, as well as other powertrain components, such as wheels, housed in the engine compartment and elsewhere in the vehicle. The wheels support the remainder of the vehicle on the ground. One, some or all of the wheels are powered by the remainder of the powertrain components to drive the vehicle along the ground.

Aspects herein can be embodied in other forms without departing from the spirit or essential attributes thereof. Accordingly, reference should be made to the following claims, rather than to the foregoing specification, as indicating the scope thereof.

What is claimed is:

1. A sunroof assembly, comprising:
a bracket removably attached to a sunroof panel and defining a cavity; and
an endcap removably attached to the bracket that closes the cavity and maintains clearance between the sunroof panel and a deflector of the sunroof assembly by contacting the deflector as the sunroof panel moves between an open position, in which the deflector is in a raised position, and a closed position, in which the deflector is in a stowed position.

2. The sunroof assembly of claim 1, wherein the endcap defines a rounded endcap point that maintains clearance between the sunroof panel and the deflector by sliding along the deflector.

3. The sunroof assembly of claim 1, wherein the sunroof panel defines a sunroof panel edge lined with encapsulation material, and wherein the endcap maintains clearance between the encapsulation material and the deflector and prevents damage to the encapsulation material by sliding along the deflector during movement of the sunroof panel between the open position and the closed position.

4. The sunroof assembly of claim 1, wherein the deflector is spring-loaded, and wherein the endcap provides mechanical advantage to push the deflector from the raised position to the stowed position by contacting the deflector as the sunroof panel moves from the open position to the closed position, and wherein the endcap inhibits rapid movement of the deflector from the stowed position to the raised position by contacting the deflector as the sunroof panel moves from the closed position to the open position.

5. The sunroof assembly of claim 1, wherein the sunroof panel defines a sunroof panel edge lined with encapsulation material, wherein the encapsulation material is installed to the sunroof panel edge using a molding process, and wherein the endcap prevents the encapsulation material from entering the cavity during the molding process by closing the cavity.

6. The sunroof assembly of claim 1, wherein the cavity defines contours, and wherein the endcap further includes one or more legs having a shape corresponding to the contours such that when the endcap is attached to the bracket, the legs are inserted to the cavity and the endcap is secured to the bracket.

7. The sunroof assembly of claim 1, wherein the endcap further defines a base that removably attaches the endcap to the sunroof panel, and further comprising endcap spacers located between the base and the sunroof panel, wherein the endcap spacers prevent damage to the sunroof panel by the base by maintaining clearance between the base and the sunroof panel.

endcap spacers prevent damage to the sunroof panel by the base by maintaining clearance between the base and the sunroof panel.

8. The sunroof assembly of claim 1, further comprising bracket spacers located between the bracket and the sunroof panel, wherein the bracket spacers prevent damage to the sunroof panel by the bracket by maintaining clearance between the bracket and the sunroof panel.

9. A sunroof assembly, comprising:
a sunroof panel defining a sunroof panel edge lined with encapsulation material installed to the sunroof panel edge in a molding process;
a bracket removably attached to a sunroof panel and defining a cavity; and
an endcap removably attached to the bracket that prevents encapsulation material from entering the cavity during the molding process by closing the cavity and that maintains clearance between a deflector of the sunroof assembly and the encapsulation material and prevents damage to the encapsulation material by contacting the deflector as the sunroof panel moves between an open position, in which the deflector is in a raised position, and a closed position, in which the deflector is in a stowed position.

10. The sunroof assembly of claim 9, wherein the endcap defines a rounded endcap point that maintains clearance between the sunroof panel and the deflector by sliding along the deflector.

11. The sunroof assembly of claim 9, wherein the deflector is spring-loaded, and wherein the endcap provides mechanical advantage to push the deflector from the raised position to the stowed position by contacting the deflector as the sunroof panel moves from the open position to the closed position, and wherein the endcap inhibits rapid movement of the deflector from the stowed position to the raised position by contacting the deflector as the sunroof panel moves from the closed position to the open position.

12. The sunroof assembly of claim 9, wherein the cavity defines contours, and wherein the endcap further includes one or more legs having a shape corresponding to the contours such that when the endcap is attached to the bracket, the legs are inserted to the cavity and the endcap is secured to the bracket.

13. The sunroof assembly of claim 9, wherein the endcap further defines a base that removably attaches the endcap to the sunroof panel, and further comprising endcap spacers located between the base and the sunroof panel, wherein the endcap spacers prevent damage to the sunroof panel by the base by maintaining clearance between the base and the sunroof panel.

14. The sunroof assembly of claim 9, further comprising bracket spacers located between the bracket and the sunroof panel, wherein the bracket spacers prevent damage to the sunroof panel by the bracket by maintaining clearance between the bracket and the sunroof panel.

15. A sunroof assembly, comprising:
a sunroof panel defining a first corner and a second corner;
a bracket removably attached to the sunroof panel that extends between the first corner and the second corner and defines a cavity having a first opening below the first corner and a second opening below the second corner;
a deflector located below the sunroof panel and defining a first deflector arm located below the first corner and a second deflector arm located below the second corner;

a first endcap removably attached to the bracket at the first opening; and a second endcap removably attached to the bracket at the second opening, wherein the first endcap and the second endcap maintain clearance between the sunroof panel and the deflector by respectively contacting the first deflector arm and the second deflector arm as the sunroof panel moves between an open position, in which the deflector is in a raised position, and a closed position, in which the deflector is in a stowed position.

16. The sunroof assembly of claim 15, wherein the first endcap and the second endcap each define a rounded endcap point that maintains clearance between the sunroof panel and the deflector by sliding along the deflector.

17. The sunroof assembly of claim 15, wherein the sunroof panel defines a sunroof panel edge lined with encapsulation material, and wherein the first endcap and the second endcap maintain clearance between the encapsulation material and the deflector and prevent damage to the encapsulation material by respectively sliding along the first deflector arm and the second deflector arm during movement of the sunroof panel between the open position and the closed position.

18. The sunroof assembly of claim 15, wherein the sunroof panel defines a sunroof panel edge lined with encapsulation material, wherein the encapsulation material is installed to the sunroof panel edge using a molding process, and wherein the first endcap and the second endcap prevent the encapsulation material from entering the cavity during the molding process by respectively closing the first opening and the second opening.

19. The sunroof assembly of claim 15, wherein the cavity defines contours, and wherein the first endcap and the second endcap each further include one or more legs having a shape corresponding to the contours such that when the first endcap and the second endcap are attached to the bracket, the legs are inserted to the cavity and the first endcap and the second endcap are secured to the bracket.

20. The sunroof assembly of claim 15, wherein the first endcap and the second endcap each further define a base that removably attaches the first endcap and the second endcap to the sunroof panel, and each further comprising endcap spacers located between the base and the sunroof panel, wherein the endcap spacers prevent damage to the sunroof panel by the base by maintaining clearance between the base and the sunroof panel.

* * * * *